United States Patent
Juillet et al.

(10) Patent No.: US 11,894,166 B2
(45) Date of Patent: Feb. 6, 2024

(54) MANUFACTURING PROCESS FOR SURGE ARRESTOR MODULE USING COMPACTION BLADDER SYSTEM

(71) Applicant: Richards Mfg. Co., A New Jersey Limited Partnership, Irvington, NJ (US)

(72) Inventors: Christopher A Juillet, Warren, NJ (US); Bruce Bier, Warren, NJ (US); Jeffrey J. Madden, Montvale, NJ (US)

(73) Assignee: Richards Mfg. Co., A New Jersey Limited Partnership, Irvington, NJ (US)

( * ) Notice: Subject to any disclaimer, the term of this patent is extended or adjusted under 35 U.S.C. 154(b) by 75 days.

(21) Appl. No.: 17/647,168

(22) Filed: Jan. 5, 2022

(65) Prior Publication Data
US 2023/0215606 A1    Jul. 6, 2023

(51) Int. Cl.
*H01C 7/12*    (2006.01)
*B29C 70/44*    (2006.01)

(52) U.S. Cl.
CPC ........... *H01C 7/126* (2013.01); *B29C 70/446* (2013.01)

(58) Field of Classification Search
CPC .............................. H01C 7/126; B29C 70/446
USPC ....................................................... 361/117
See application file for complete search history.

(56) References Cited

U.S. PATENT DOCUMENTS

| | | | |
|---|---|---|---|
| 3,913,127 A | 10/1975 | Suzuki | |
| 4,272,411 A | 6/1981 | Sokoly | |
| 4,282,557 A | 8/1981 | Stetson | |
| 4,296,002 A | 10/1981 | Sokoly | |
| 4,298,900 A | 11/1981 | Avdeenko | |
| 4,352,140 A | 9/1982 | Axelsson | |
| 4,388,603 A | 6/1983 | Hassler | |
| 4,404,614 A | 9/1983 | Koch | |
| 4,444,351 A | 4/1984 | Dries | |
| 4,456,942 A * | 6/1984 | Bronikowski | H01C 7/12 361/127 |
| 4,656,555 A | 4/1987 | Raudabaugh | |

(Continued)

FOREIGN PATENT DOCUMENTS

| | | |
|---|---|---|
| CA | 2356383 C | 1/2009 |
| CA | 2743094 A1 | 5/2010 |

(Continued)

*Primary Examiner* — Thienvu V Tran
*Assistant Examiner* — Sreeya Sreevatsa
(74) *Attorney, Agent, or Firm* — Nixon Peabody LLP

(57) ABSTRACT

The present disclosure is directed to a method of producing a surge arrestor module, comprising the acts of (i) providing a plurality of MOV blocks arranged in a stack, (ii) applying an epoxy-reinforced structural layer to an outer surface of the stack, (iii) after the applying, inserting the stack into a flexible bladder, and (iv) curing the epoxy-reinforced structural layer with elevated temperatures while the flexible bladder applies radially aligned pressure to the stack and a tool applies axially aligned pressure to the stack. The present disclosure also includes an apparatus for performing the methods described herein. The apparatus includes an outer case structure and a flexible bladder that fits within the outer case structure. A hollow inner region of the outer case structure is pressurized to force the flexible bladder against the surge arrestor module as the surge arrestor module is curing.

22 Claims, 4 Drawing Sheets

(56) References Cited

U.S. PATENT DOCUMENTS

| | | | |
|---|---|---|---|
| 4,729,053 A | 3/1988 | Maier | |
| 4,780,598 A | 10/1988 | Fahey | |
| 4,825,188 A | 4/1989 | Parraud | |
| 4,833,438 A | 5/1989 | Parraud | |
| 4,851,955 A | 7/1989 | Doone | |
| 4,899,248 A | 2/1990 | Raudabaugh | |
| 4,962,440 A | 10/1990 | Johnnerfelt | |
| 4,992,906 A | 2/1991 | Doone | |
| 5,003,689 A * | 4/1991 | Doone | H01C 7/126 156/286 |
| 5,008,646 A | 4/1991 | Hennings | |
| 5,043,838 A | 8/1991 | Sakich | |
| 5,047,891 A | 9/1991 | Nedriga | |
| 5,088,001 A * | 2/1992 | Yaworski | H01C 7/12 338/21 |
| 5,114,357 A | 5/1992 | Luzzi | |
| 5,128,824 A | 7/1992 | Yaworski | |
| 5,159,748 A | 11/1992 | Doone | |
| 5,218,508 A | 6/1993 | Doone | |
| 5,220,480 A | 6/1993 | Kershaw, Jr. | |
| 5,225,265 A | 7/1993 | Prandy | |
| 5,237,482 A | 8/1993 | Osterhout | |
| 5,291,366 A | 3/1994 | Giese | |
| 5,313,184 A | 5/1994 | Greuter | |
| 5,363,266 A | 11/1994 | Wiseman | |
| 5,497,138 A | 3/1996 | Malpiece | |
| 5,570,264 A | 10/1996 | Lundquist | |
| 5,602,710 A | 2/1997 | Schmidt | |
| 5,608,597 A | 3/1997 | Holmstrom | |
| 5,652,690 A | 7/1997 | Mansfield | |
| 5,802,814 A | 9/1998 | Sano | |
| 5,842,096 A | 11/1998 | Mabbott | |
| 5,912,611 A | 6/1999 | Berggren | |
| 5,923,518 A | 7/1999 | Hensley | |
| 5,926,356 A | 7/1999 | Sakich | |
| 5,930,102 A | 7/1999 | Rook | |
| 5,936,826 A | 8/1999 | Schmidt | |
| 5,959,822 A | 9/1999 | Bock | |
| 5,990,778 A | 11/1999 | Stumpier | |
| 6,008,975 A | 12/1999 | Kester | |
| 6,008,977 A | 12/1999 | Thatcher | |
| 6,185,813 B1 | 2/2001 | Donnola | |
| 6,279,811 B1 | 8/2001 | Ramarge | |
| 6,396,676 B1 | 5/2002 | Doone | |
| 6,735,068 B1 * | 5/2004 | Hartman | H01C 7/126 361/127 |
| 7,272,885 B2 | 9/2007 | Hassanzadeh | |
| 7,381,103 B2 | 6/2008 | Luzzi | |
| 7,503,785 B2 | 3/2009 | Stepniak | |
| 7,643,265 B2 | 1/2010 | Loader | |
| 7,958,631 B2 | 6/2011 | Hughes | |
| 8,117,739 B2 | 2/2012 | Ramarge | |
| 8,502,637 B2 | 8/2013 | Guarniere | |
| 8,531,812 B2 | 9/2013 | Barenthin | |
| 9,396,848 B2 | 7/2016 | Fuechsle | |
| 9,728,307 B2 | 8/2017 | Luzzi | |
| 9,761,356 B2 | 9/2017 | Hsu | |
| 10,755,838 B2 | 8/2020 | Kruska | |
| 10,780,215 B2 | 9/2020 | Rosinko | |
| 11,177,058 B2 | 11/2021 | Kester | |
| 11,223,200 B2 | 1/2022 | Tsovilis | |
| 2004/0111867 A1 | 6/2004 | Hassanzadeh | |
| 2005/0160587 A1 * | 7/2005 | Ramarge | H01C 7/12 29/613 |
| 2011/0216464 A1 | 9/2011 | Barenthin | |
| 2011/0287652 A1 | 11/2011 | Rosciczewski | |
| 2014/0268471 A1 | 9/2014 | Luzzi | |
| 2019/0066888 A1 * | 2/2019 | Kester | H02H 9/041 |
| 2021/0287830 A1 | 9/2021 | Pippert | |

FOREIGN PATENT DOCUMENTS

| | | |
|---|---|---|
| DE | 3334533 A1 | 4/1985 |
| EP | 0642141 A1 | 3/1995 |
| JP | 03-034522 | 2/1991 |
| JP | 11-340635 | 12/1999 |
| JP | 2003028351 A | 1/2003 |
| JP | 2003318009 A | 11/2003 |
| JP | 2004117231 A | 4/2004 |
| JP | 2009277388 A | 11/2009 |
| WO | WO 99/08353 A1 | 2/1999 |
| WO | WO 99/18642 A1 | 4/1999 |
| WO | WO 2020/057915 A1 | 3/2020 |

* cited by examiner

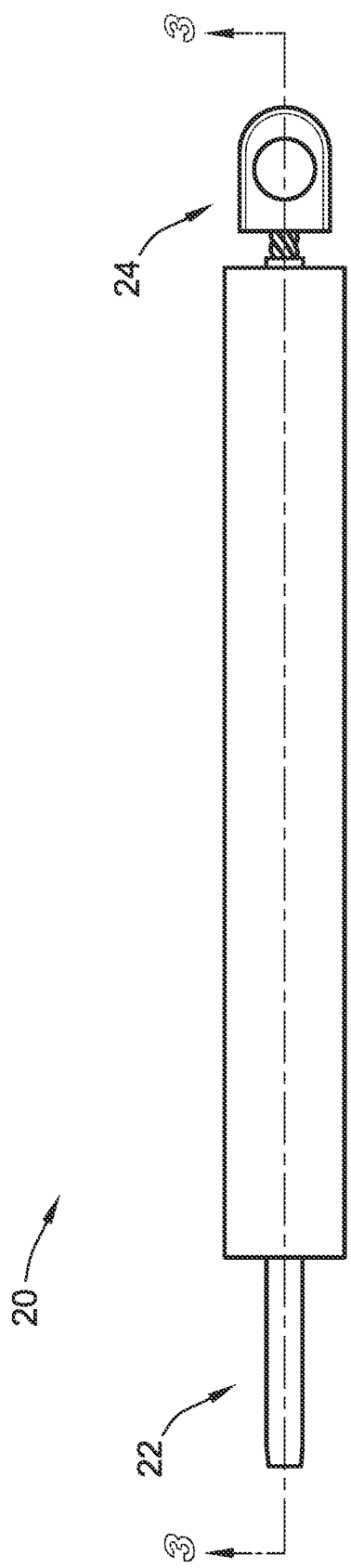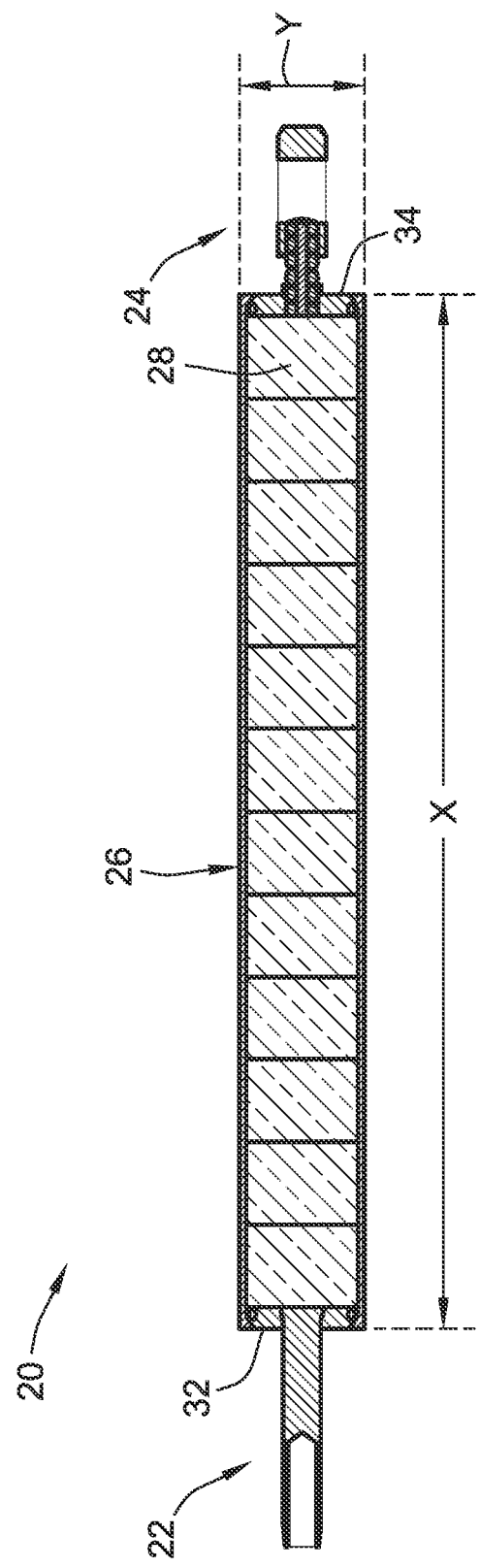

MANUFACTURING PROCESS FOR SURGE ARRESTOR MODULE USING COMPACTION BLADDER SYSTEM

COPYRIGHT

A portion of the disclosure of this patent document may contain material which is subject to copyright protection. The copyright owner has no objection to the facsimile reproduction by anyone of the patent disclosure, as it appears in the Patent and Trademark Office patent files or records, but otherwise reserves all copyright rights whatsoever

FIELD OF THE INVENTION

The present invention relates to surge arrestor modules that protect equipment from electrical disturbances. More particularly, this invention relates to a process for making a surge arrestor having a series of metal oxide varistor (MOV) blocks in contact with each other and a fiberglass-reinforced layer that surrounds the MOV blocks.

BACKGROUND OF THE INVENTION

A surge arrester is a protective device that is commonly connected in parallel with a more expensive piece of electrical equipment to divert current surges from over-voltage conditions safely around the electrical equipment. When exposed to the over-voltage condition, the surge arrester operates in a low impedance mode that provides a current path to electrical ground. By doing so, the surge arrestor protects the internal circuitry of the electrical equipment from damage due to the over-voltage condition. After an over-voltage condition has been experienced, the surge arrester returns to operation in the high impedance mode in which the surge arrester provides a current path to ground having a relatively high impedance.

Surge arrestors are often made from a stack of MOV blocks. Each MOV block is characterized by having a relatively high resistance when exposed to a normal operating voltage, and a much lower resistance when exposed to a higher voltage, such as a higher voltage associated with over-voltage conditions. The number of MOV blocks in a stack and/or the length of each MOV block is selected to support various system voltages. There are two contacts at the end of each MOV stack. The contact on one end is typically configured with a lug-style interface for attaching to a bushing and the contact on the other end is typically a copper tube with a crimp barrel (or other connecting structure) for attaching a ground wire.

Each MOV block in the stack must maintain proper electrical contact with the adjacent MOV blocks so as to reduce the contact resistance. Furthermore, the magnitude of the current in over-voltage conditions can be significant and produce high electromechanical forces on the surge arrester stack. For these reasons, surge arrester stacks must be made from high strength materials and are placed under compression loads. To provide the compression loading, the individual MOV blocks are typically held together by a fiberglass reinforcing structure applied to the outside surfaces for increased physical strength. For use in shielded distribution devices, the surge arrester's fiberglass reinforcing structure must be free of voids or air pockets. Any air voids within the fiberglass or between the fiberglass and outside surface of the MOV blocks could cause electrical discharge once energized and would ultimately result in a failure of the device.

One known method for applying the fiberglass onto the surge arrester stack is to use fiberglass sheet that is pre-impregnated with epoxy resin and wrapped several times around the MOV blocks and end contacts to build up the desired wall thickness. The epoxy resin, when heated, cures and solidifies to form a very high strength substrate encapsulating the MOV blocks and end contacts. While curing in the oven, the fiberglass and pre-impregnated epoxy resin must be compressed to eliminate air voids between the wrapped layers of the pre-impregnated fiberglass. One method for compressing the pre-impregnated fiberglass known in the industry is disclosed in U.S. Pat. No. 8,117,739, which uses a shrink film radially wrapped over the outside of the fiberglass that shrinks when exposed to heat. This shrinking of the film exerts a compaction force on the fiberglass and epoxy while it is being heated and cured.

There are at least two main issues with the use of shrink film to compact the fiberglass and epoxy while curing. One issue is that the level of compaction cannot be varied. The level of compaction is dictated by the shrink ratio of the film material being used and cannot be varied or increased, if needed. As the layers of fiberglass wrapping increase to achieve increased strength, the amount of compaction force needed to eliminate any air voids also increases. Another issue that arises when using shrink film for compaction is that after the film is removed, there are impressions left on the fiberglass/epoxy in the areas where the shrink film overlapped itself. This results in the fiberglass and epoxy needing to be sanded and smoothed out after curing in the oven and removing the shrink film. This additional operation of cleaning the fiberglass surface is not desirable and requires a lot of attention by the operator to ensure a smooth surface that is free of any dents or scratches.

Consequently, there is a need for a more reliable and efficient method of making surge arrestors. The present disclosure provides a new method for producing a surge arrestor stack that helps to eliminate air gaps, provides consistency in the outer surfaces of the stack, and that can deliver a variable amount of force during the curing process. All these and other objects of the present invention will be understood through the detailed description of the invention below.

SUMMARY OF THE INVENTION

In one aspect, the present invention is directed to a method of producing a surge arrestor module, comprising the acts of (i) providing a plurality of MOV blocks arranged in a stack, (ii) applying an epoxy-fiberglass layer to an outer surface of the stack, (iii) placing the stack with the applied epoxy-fiberglass layer into a flexible bladder, and (iv) while the epoxy-fiberglass layer is curing around the outer surface of the stack, applying pressure to the flexible bladder to generate a compressive force to the epoxy-fiberglass layer and the stack.

In another aspect, the present invention is directed to a method of producing a surge arrestor module, comprising the acts of (i) providing a plurality of MOV blocks arranged in a stack, (ii) applying an epoxy-reinforced structural layer to an outer surface of the stack, (iii) after the applying, inserting the stack into a flexible bladder, and (iv) curing the epoxy-reinforced structural layer with elevated temperatures while the flexible bladder applies radially aligned pressure to the stack and a tool applies axially aligned pressure to the stack.

In a further aspect, the present invention is an apparatus for producing a surge arrestor module, comprising an outer case structure, a flexible bladder, and a pressure source. The outer case structure has an inner surface and an outer surface. The inner surface forms a hollow region. The outer case structure including a port that provides access to the hollow region. The flexible bladder is located within the hollow region. The flexible bladder is sized and configured to receive the surge-arrestor stack. The surge arrestor stack has a plurality of MOV blocks and a layer of epoxy-reinforced structural material on exterior surfaces of the plurality of MOV blocks. The pressure source delivers pressurized air into the hollow region of the outer case structure via the port. The pressurized air forces the flexible bladder to compress against the surge-arrestor stack while the epoxy-reinforced structural material cures.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The present invention will be described with greater specificity and clarity with reference to the following drawings, in which:

FIG. 2 illustrates a side view of a surge arrestor module within the assembly of FIG. 1.

FIG. 3 illustrates a cross-sectional view of the surge arrestor module of FIG. 2 taken along line 3-3 in FIG. 2.

Figure 1:
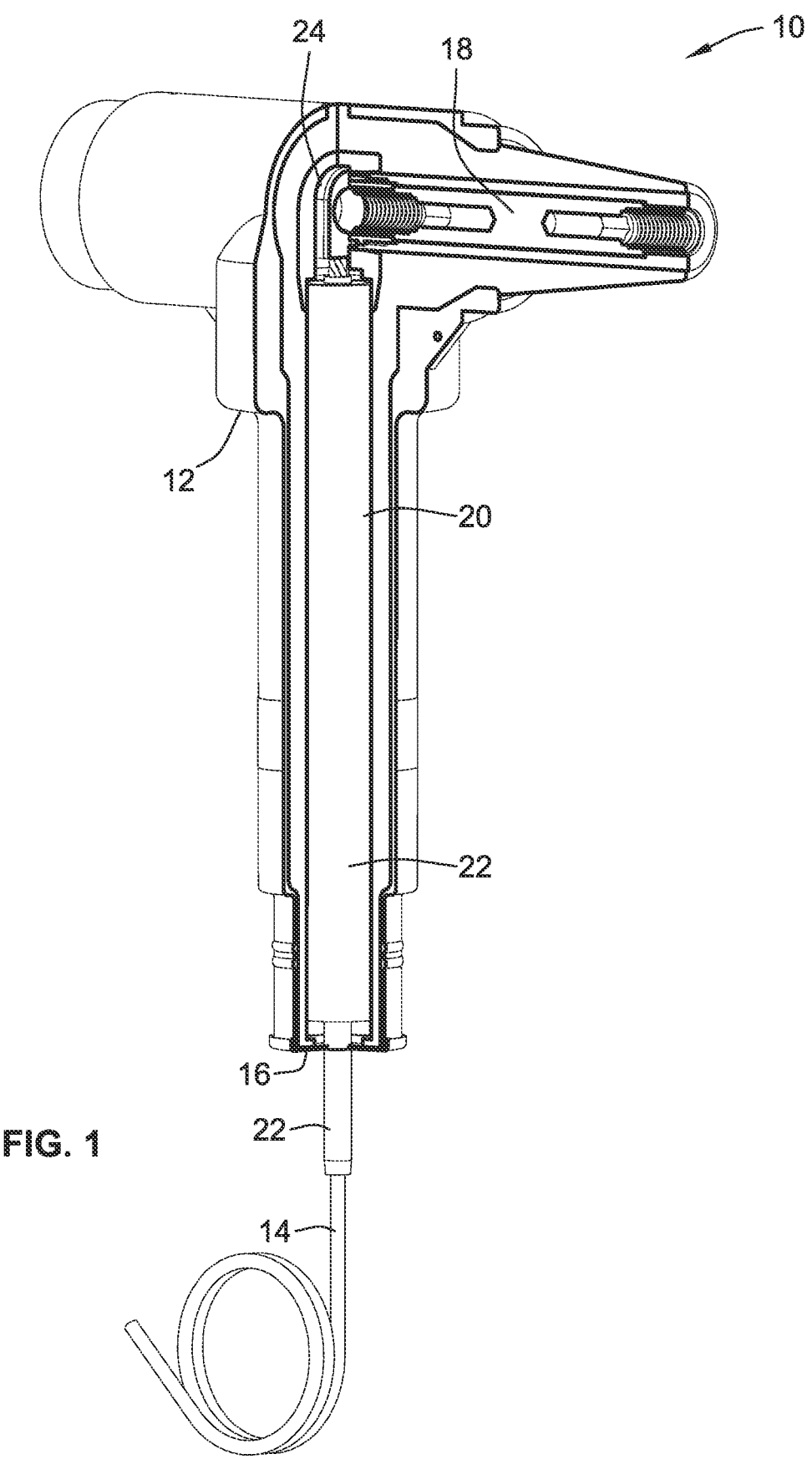
FIG. 1 illustrates a typical surge arrestor assembly that utilizes a surge arrestor module.

While the invention is susceptible to various modifications and alternative forms, specific embodiments will be shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

The drawings will herein be described in detail with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

FIG. 1 illustrates one exemplary surge arrestor assembly 10 that includes a housing 12. The surge arrestor assembly 10 is electrically coupled to a ground wire 14 through a lower sealing cap 16. The upper portion of housing 12 includes an interface device 18 that allows for electrical coupling to an incoming wire or connector associated with the electrical equipment (not shown) that requires surge protection. The housing 12 of the surge arrestor assembly 10 encases a surge arrestor module 20 that provides the path for electrical current to reach the ground wire 14 when over-voltage conditions are experienced by the electrical equipment. The surge arrestor module 20 includes a ground-wire connector 22 to be coupled to the ground wire 14 and an interface connector 24 for connection to the interface device 18. It should be understood that the surge arrestor module 20 can be used with other styles and configurations for surge arrestor assemblies. The details of the surge arrestor module 20 and its method of manufacturing are discussed in more detail below.

FIGS. 2 and 3 illustrate, respectively, a side view and a cross-sectional view of the surge arrestor module 20. Between the ground-wire connector 22 and the interface connector 24, the surge arrestor module 20 includes a plurality of metal oxide varistor (MOV) blocks 28 that are arranged in a stack. The number of MOV blocks 28, their diameters, and their lengths (as measured along the long axis of the surge arrestor module 20) can vary depending on the electrical protection specifications of the surge arrestor module 20. As shown in FIG. 3, the axial length "X" of the surge arrestor module 20 is typically between 7 inches and 20 inches, and the diameter "Y" is typically between 1 inch and 3 inches. In one exemplary embedment, the axial length "X" of the surge arrestor module 20 is about 12 inches and the diameter "Y" is about 1.5 inches. In some embodiments in which a lesser number of MOV blocks 28 is needed for a lower voltage stack, a MOV block 28 may be replaced with an aluminum block of the same diameter and height to permit use of the same manufacturing fixtures.

The MOV blocks 28 are held together through an epoxy-fiberglass outer layer 26. The epoxy-fiberglass outer layer 26 is typically made from a fiberglass that is pre-impregnated with an epoxy resin, which requires a curing process as described in more detail below. In the final product after the curing process, the epoxy-fiberglass outer layer 26 generally has a thickness in the range of about ⅛ inch to about 3/16 inch. In one preferred embodiment, the epoxy-fiberglass outer layer 28 has a thickness of about ⅛ inch. Though the outer layer 26 is described as being used with a fiberglass-based material, the outer layer 26 can be used with other types of structurally reinforced materials, such as carbon-fiber-epoxy composite materials.

The ground-wire connector 22 is in direct electrical connection with a lower block contact 32, which contacts the lowermost MOV block 28. The interface connector 24 is in direct electrical connection with an upper block contact 34, which contacts the uppermost MOV block 28. As illustrated, the ground-wire connector 22 and the lower block contact 32 are two separate pieces that are connected. But in other embodiments, these two pieces 22 and 32 can be a unitary piece. Similarly, the interface connector 24 and the upper block contact 34 are illustrated as two separate pieces that are connected. But in other embodiments, they can be a unitary piece. In one embodiment, the upper and lower contacts 32, 34 have circumferentially arranged grooves machined into their surfaces to help retain them on the MOV blocks 28. After wrapping a few layers of the epoxy-reinforced fiberglass sheet over the MOV blocks 28 and the contacts 32, 34, stainless steel wire is wrapped around the contacts 32, 34 and tensioned to pull the fiberglass layers into the grooves of the contacts 32, 34. After tensioning, the stainless steel wires are tied off and the remaining layers of the fiberglass are wrapped onto the assembly, including over the stainless steel wires. When the epoxy cures (as described in more detail below), it solidifies the fiberglass that is wrapped into the grooves of the contacts 32, 34 to lock the contacts 32, 34 and the blocks 28 together.

Figure 4:
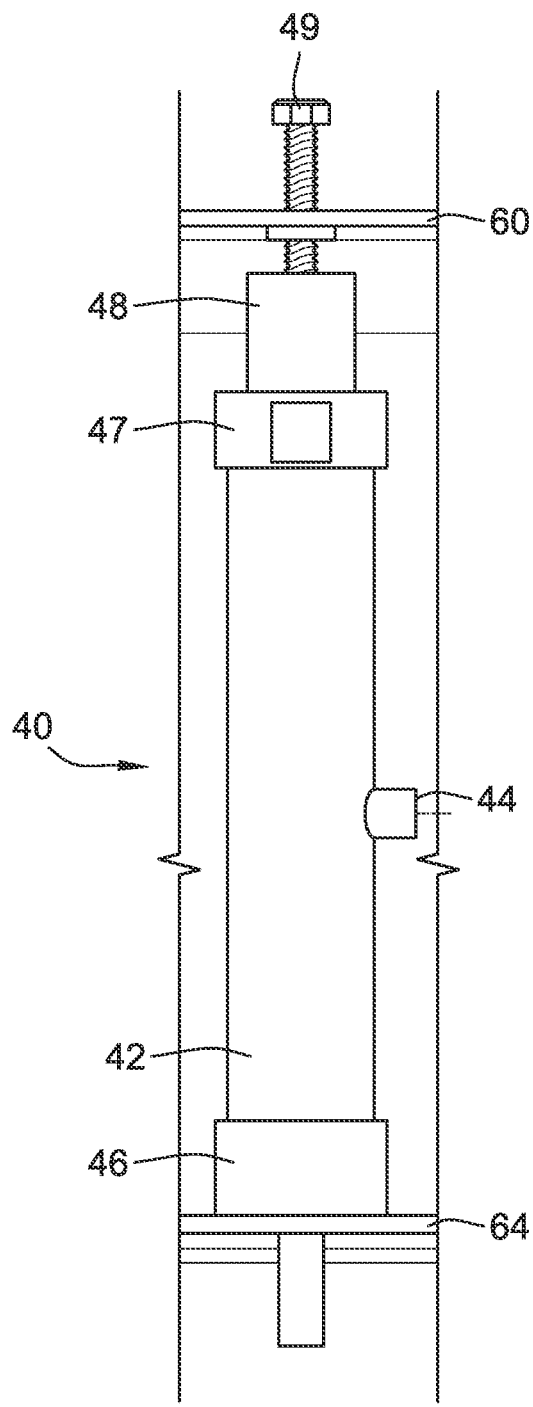
FIG. 4 illustrates a side view of a pressure fixture for manufacturing the surge arrestor module of FIGS. 2-3.
Figure 5:
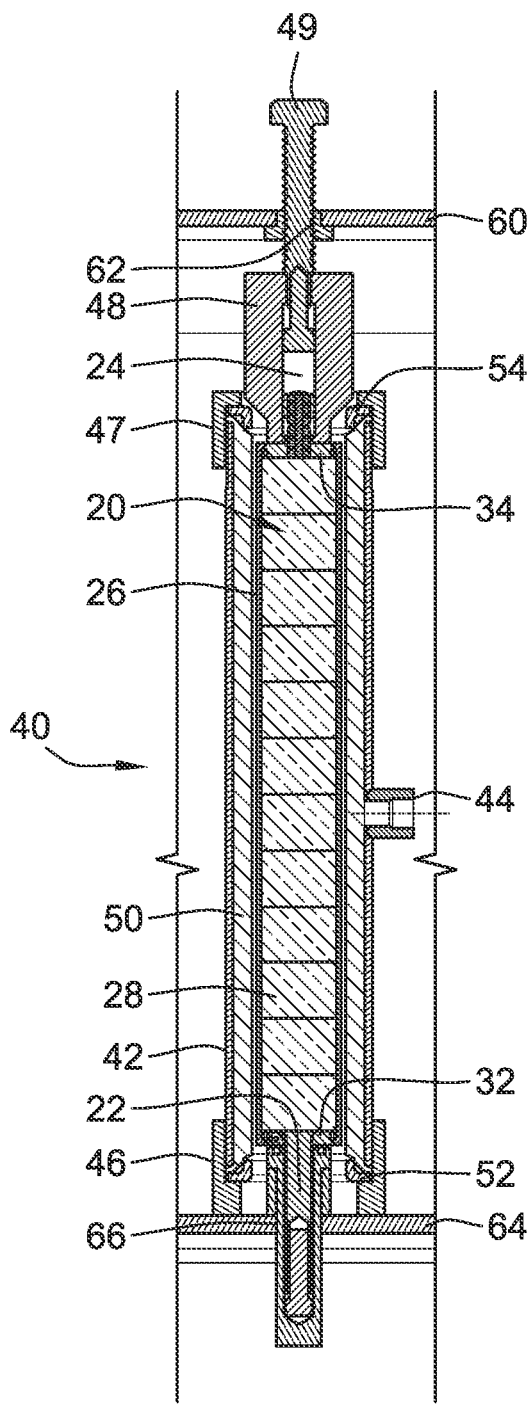
FIG. 5 illustrates a cross-sectional view of the pressure fixture of FIG. 4.

FIGS. 4 and 5 illustrate, respectively, a side view and a cross-sectional view of a pressure fixture 40 used for manufacturing the surge arrestor module 20 of FIGS. 2-3. The pressure fixture 40 includes an outer tubular structure 42, which may be made of steel or other rigid materials. The tubular structure 42 includes a port 44 for allowing a fluid to enter the internal hollow region of the tubular structure 42. The tubular structure 42 includes a lower end collar 46 and an upper end collar 47 that help to seal the ends of the tubular structure 42. In one preferred embodiment, the lower end collar 46 and the upper end collar 47 have internal female threaded surfaces for threadably engaging a male threaded outer surface of the tubular structure 42. A moveable tool 48 fits within the upper end collar 47 and engages the end region (e.g., the upper block contact 34) of the surge arrestor module 20 adjacent to the interface connector 24. The moveable tool 48 can be moved upwardly and downwardly via rotation of a threaded screw 49.

As shown best in FIG. 5, the surge arrestor module 20 is located within a flexible bladder 50, which itself fits within the outer tubular structure 42. The flexible bladder 50 is preferably generally cylindrical in shape and has an inner dimension that is about the same as the outer diameter of the surge arrestor module 20. The flexible bladder 50 is typically made of natural rubber or synthetic rubber and has a wall thickness of about ¼ inch to about 5/16 inch.

The inner wall surface of the flexible bladder 50 is designed to place pressure against the epoxy-fiberglass layer 26 that surrounds the stack of MOV blocks 28. A pair of bladder sealing rings 52 and 54 are located, respectively, at the lower and upper regions of the flexible bladder 50 to seal the flexible bladder 50 against the lower end collar 46 and the upper end collar 47. As such, when air is pumped into the port 44 of the tubular structure 42 of the fixture 40, the outer surface of the flexible bladder 50 is acted upon by the air pressure, causing the flexible bladder 50 to provide a compressive force against the epoxy-fiberglass layer 26. A small gap between the outer surface of the flexible bladder 50 and the inner surface of the tubular structure 42 allows the air to flow entirely around the flexible bladder 50, thereby creating an equal amount of pressure on the surface, which is transferred into the epoxy-fiberglass layer 26. The applied pressure of the flexible bladder 50 is beneficial during the curing process of the epoxy-fiberglass layer 26, as described below. Though the illustrated embodiment is described as using air pressure on the flexible bladder 50, the present invention contemplates other fluids (e.g., other gases or liquids) may be used within the tubular structure 42 to supply the pressure to the flexible bladder 50.

In manufacturing the surge arrestor module 20, the epoxy-fiberglass layer 26 requires a curing process in which it hardens on the MOV blocks 28 to strengthen the overall surge arrestor module 20. Initially, the epoxy-fiberglass layer 26 is created by fiberglass material that is pre-impregnated with an epoxy resin that is wrapped (usually multiple times) around the stack of the MOV blocks 28. The stack of the MOV blocks 28 has the ground-wire connector 22 and the lower block contact 32 located against the lowermost MOV block 28. The interface connector 24 and the upper block contact 34 are located against the uppermost MOV block 28.

In one embodiment, to keep the flowable epoxy resin contained during the curing process, a thin layer of polyvinylidene chloride (PVDC) or polyethylene (e.g., about 0.0005 inches to 0.0015 inch in thickness) is used as an outer layer for the stack to inhibit the epoxy from directly contacting the flexible bladder 50. During the curing process, the thin outer layer of polyvinylidene chloride or polyethylene is absorbed into and becomes a part of the stack. Once this wrapping process is completed, the stack of MOV blocks 28 with the uncured epoxy-fiberglass layer 26 (and preferably the thin PVDC or polyethylene layer) is then inserted into the flexible bladder 50. The flexible bladder 50 is then inserted into the tubular structure 42. In one embodiment, the inside diameter of the end collars 46 and 47 are configured to allow the uncured wrapped stack to pass through them for placement in the tubular structure 42.

As shown in FIG. 5, the moveable tool 48 fits within the upper end cap 47. The threaded screw 49 is threadably connected to a top wall 60 of the pressure fixture 40 via a female threaded nut 62 that is fixed into the top wall 60. When the threaded screw 49 is rotated, it moves the moveable tool 48 upwardly and downwardly relative to the upper end cap 47. As the moveable tool 48 moves downwardly, the lowermost end of the moveable tool 48 engages the upper block contact 34 so as to apply a compressive force during curing. A bottom wall 64 of the pressure fixture 40 includes a protruding structure 66 that is hollow so as to receive the ground-wire connector 22 of the surge arrestor module 20. In some embodiments, the protruding structure 66 is part of the overall pressure fixture 40, but is a separate piece that is installed over the ground-wire connector 22 before loading the stack into the pressure fixture 40. The bottom wall 64 includes a slot that receives the protruding structure 66 as it is moved from the side toward the middle region of the bottom wall 64. The protruding structure 66 has a shoulder that presses against the bottom wall 64 and an upper surface that engages the lower block contact 32. The protruding structure 66 is the lower base structure for supporting the stack that is compressed together via the threaded screw 49 and the moveable tool 48. Thus, when the uncured surge arrestor module 20 is placed in the fixture 40, the fixture 40 includes components (e.g., the protruding structure 66 and the movable tool 48) that clamp the MOV block 28 and the lower and upper block contacts 32, 34 under pressure in the axial direction. By rotating the screw 49, the moveable tool 48 is urged downwardly to provide axial force to the MOV block 28 and the lower and upper block contacts 32, 34 to ensure the blocks 28 and lower and upper block contacts 32, 34 are in good contract with each other. This axial pressure on each stack is preferably the same, which is accomplished by applying the same torque (e.g., 10 ft-lbs) to each of the screws 49 (see FIG. 6) of the fixtures 40. Though the screw 49 can be manually rotated, it can also be automatically rotated by a motor, such that the combination of the motor and the screw 49 acts like a screw-driven linear actuator. The fixture 40 may include sensor(s) in, for example, the protruding structure 66, the movable tool 48, and the flexible bladder 50, such that the axial and radial compression forces (and pressure) are known before and during the curing process.

Once the pressure fixture 40 is assembled and holds the uncured surge arrestor module 20, the air pressure can be supplied to the port 44 to provide radial compression on the uncured surge arrestor module 20 via the flexible bladder 50.

Because elevated temperatures are typically needed to cure the epoxy-fiberglass layer 26, in one embodiment, the entire pressure fixture 40 is located within an oven that maintains a constant temperature for the pressure fixture 40 and the to-be-cured surge arrestor module 20. The air circulated into the port 44 can be unheated or heated air from the oven. The air pressure acting on the flexible bladder is typically greater than 30 PSI, greater than 40 PSI, and often great than 50 PSI. The curing temperature for the epoxy-fiberglass layer 26 (e.g., supplied by the oven) is typically greater than about 200° F., greater than about 220° F., greater than about 240° F., greater than about 280° F., or greater than about 300° F. The curing time for the epoxy-fiberglass layer 26 is typically greater than 1 hour, greater than 2 hours, greater than 3 hours, or greater than 4 hours. In one embodiment, the air pressure is about 45 PSI, the curing temperature is about 270° F., and the curing time is about 4 hours.

During the curing process, while the epoxy resin is softening from the elevated temperatures, the radial pressure exerted by the flexible bladder 50 forces the air pockets within the fiberglass layer 26 to exit from the fiberglass layer, often at the ends of the stack. During curing, the level of radial pressure can be varied by increasing or decreasing the air pressure acting on the flexible bladder 50, which assists in the removal of air pockets. In one preferred embodiment, the curing temperature (e.g., from the oven) is raised slowly over time to allow more time for air bubbles to escape from the fiberglass before the epoxy becomes fully cured. After the curing cycle is complete, the pressure fixture 40 is de-pressurized and the cured surge arrester module 20 can be removed from the pressure fixture 40. At this point, the outside surface of the surge arrester module 20 is substantially free of surface defects and is substantially smooth. The outer surface of the surge arrester module 20 typically does not need to be cleaned or polished prior to installing in the housing 12 of the surge arrestor assembly 10 shown in FIG. 1. Further, due to the increased radial compaction pressures, the number of internal voids in the fiberglass/epoxy layer 26 of the surge arrestor module 20 is substantially reduced or eliminated. The thickness of the fiberglass/epoxy layer 26 is reduced by about 0.05 inch to about 0.1 inch due to the radial compressive forces during the curing process.

Figure 6:
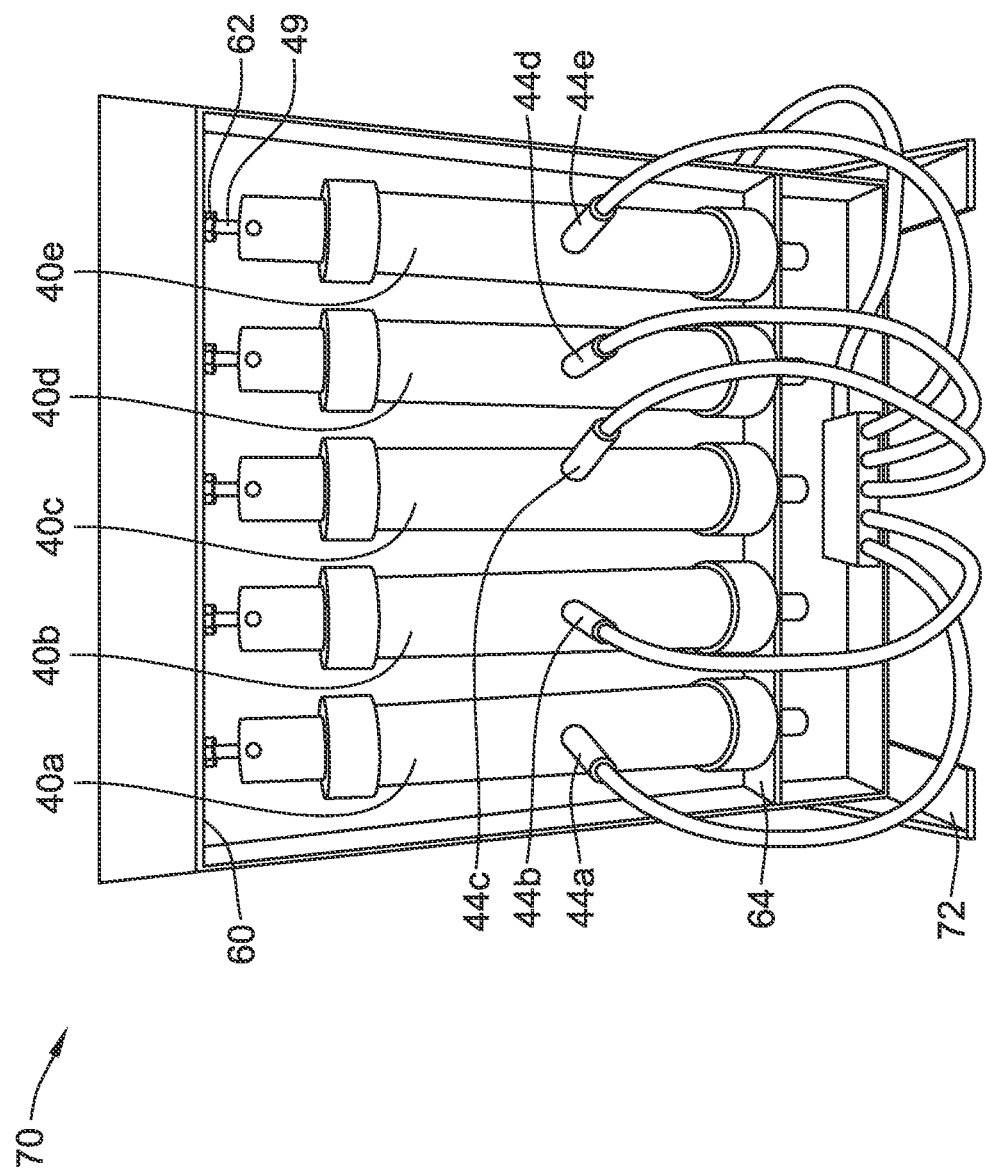
FIG. 6 illustrates a mounting frame for manufacturing multiple surge arrestor modules.

FIG. 6 illustrates a mounting frame 70 for simultaneously manufacturing multiple surge arrestor modules by use of multiple pressure fixtures 40a-40e. The mounting frame 70 includes a base 72 allowing the mounting frame 70 to stand upright and receive multiple pressure fixtures 40a-40e. Although five stations are shown to receive the five pressure fixtures 40a-40e, the mounting frame 70 can include any number of stations for receiving the mounting fixture(s) 40.

Each of the pressure fixtures 40a-40e is mounted between the bottom wall 64 of the mounting frame 70 and the top wall 60. The top wall 60 includes the threaded nuts 62 for receiving the screws 49 for each of the pressure fixtures 40. In FIG. 6, the heads of the screws 49 are not shown as they are behind the framework adjacent to the top wall 60. The mounting frame 70 is open in the middle region to provide access for air lines that mate with the ports 44a-44e of the five pressure fixtures 40a-40e. The mounting frame 70 and the related components (e.g., air lines) are designed to fit within a commercial oven for curing the five surge arrestor modules 20 that are located within the five pressure fixtures 40a-40e.

These embodiments and obvious variations thereof is contemplated as falling within the spirit and scope of the claimed invention, which is set forth in the following claims.

Moreover, the present concepts expressly include any and all combinations and subcombinations of the preceding elements and aspects.

We claim:

1. A method of producing a surge arrestor module, comprising:
providing a plurality of MOV blocks arranged in a stack;
applying an epoxy-fiberglass layer to surround an outer surface of the stack;
placing the stack with the applied epoxy-fiberglass layer into a flexible bladder, the flexible bladder being located in an outer tube structure; and
while the epoxy-fiberglass layer is curing around the outer surface of the stack, applying air pressure between an outer surface of the flexible bladder and an inner surface of the outer tube structure to generate a compressive force to the epoxy-fiberglass layer and the stack.

2. The method of claim 1, further including, applying heat to create a curing temperature that is greater than 200° F.

3. The method of claim 2, further including, after the curing, releasing the pressure to the flexible bladder, and removing the stack with the cured epoxy-fiberglass layer from the flexible bladder.

4. The method of claim 1, wherein the epoxy-fiberglass layer is comprised of an epoxy-impregnated fiberglass material that is wrapped around the stack multiple times before the act of placing the stack into the flexible bladder.

5. The method of claim 1, wherein the air pressure increases the size of a gap between the outer surface of the flexible bladder and the inner surface of the outer tube structure during the curing process.

6. The method of claim 5, wherein the air pressure is at least 30 psi.

7. The method of claim 1, further including, while the epoxy-reinforced fiberglass layer is curing around the outer surface of the stack, applying axial pressure to the stack to force the plurality of MOV blocks into tight engagement.

8. The method of claim 7, wherein the axial pressure is applied by at least one screw that is coupled to a moveable press tool adjacent to an end region of the outer tube structure.

9. The method of claim 1, wherein the epoxy-fiberglass layer is in direct contact with the outer surface of the stack when surrounding the outer surface of the stack.

10. A method of producing a surge arrestor module, comprising:
providing a plurality of MOV blocks arranged in a stack;
surrounding the stack with an uncured epoxy-reinforced structural layer;
after the applying, inserting the stack into a flexible bladder that is located in an outer tube structure; and
curing the epoxy-reinforced structural layer with elevated temperatures while the flexible bladder applies radially aligned pressure to the stack and a tool applies axially aligned pressure to the stack, the radially aligned pressure being due to air pressure between an outer surface of the flexible bladder and an inner surface of the outer tube structure.

11. The method of claim 10, wherein the air pressure increases the size of a gap between the outer surface of the flexible bladder and the inner surface of the outer tube structure during the act of curing.

12. The method of claim 10, wherein the axially aligned pressure is due to rotation of at least one screw that is coupled to the tool, the rotation of the at least one screw axially moving the tool toward the stack.

13. The method of claim 10, wherein the epoxy-reinforced structural layer is an epoxy-impregnated fiberglass material that is wrapped around the stack multiple times before the act of inserting the stack into the flexible bladder.

14. The method of claim 10, further including applying an outer layer of material to the epoxy-reinforced structural layer to serve as a barrier between the flexible bladder and the epoxy-reinforced structural layer, the outer layer of material being a thin layer of PVDC material or a polyethylene-based material.

15. An apparatus for producing a surge arrestor module, comprising:
    an outer case structure having an inner surface and an outer surface, the inner surface forming a hollow region, the outer case structure including a port that provides access to the hollow region;
    a flexible bladder located within the hollow region, the flexible bladder being sized and configured to receive the surge-arrestor stack, the surge arrestor stack having a plurality of MOV blocks and a layer of epoxy-reinforced structural material on exterior surfaces of the plurality of MOV blocks; and
    a pressure source for delivering pressurized air into the hollow region of the outer case structure via the port, the pressurized air forcing the flexible bladder to compress against the surge-arrestor stack while the epoxy-reinforced structural material cures.

16. The apparatus of claim 15, wherein the pressurized air is heated air to assist with the curing process.

17. The apparatus of claim 15, further including at least one moveable press tool that applies compressive force along a central axis of the surge-arrestor stack during the curing process.

18. The apparatus of claim 17, wherein the moveable press tool is driven by a screw that urges the moveable press tool toward the surge-arrestor stack.

19. The apparatus of claim 17, wherein the flexible bladder provides a compressive force to the surge-arrestor stack in a radial direction relative to the central axis.

20. A method of producing a surge arrestor module, comprising:
    providing a plurality of MOV blocks arranged in a stack;
    applying an epoxy-fiberglass layer to surround an outer surface of the stack;
    placing the stack with the applied epoxy-fiberglass layer into a flexible bladder;
    applying heat to create a curing temperature that is greater than 200° F.;
    while the epoxy-fiberglass layer is curing around the outer surface of the stack, applying pressure to the flexible bladder to generate a compressive force to the epoxy-fiberglass layer and the stack; and
    after the curing, releasing the pressure to the flexible bladder, and removing the stack with the cured epoxy-fiberglass from the flexible bladder.

21. The method of claim 20, wherein the epoxy-fiberglass layer is in direct contact with the outer surface of the stack when surrounding the outer surface of the stack.

22. The method of claim 20, further including, while the epoxy-reinforced fiberglass layer is curing around the outer surface of the stack, applying axial pressure to the stack to force the plurality of MOV blocks into tight engagement.

* * * * *